May 3, 1966  W. A. MUELLER  3,249,516
FRACTIONAL DISTILLATION COLUMN WITH INCLINED WALL SECTIONS
Filed May 15, 1962  9 Sheets-Sheet 2

Fig. 2

Inventor
Walter Adolf MUELLER
Attorney

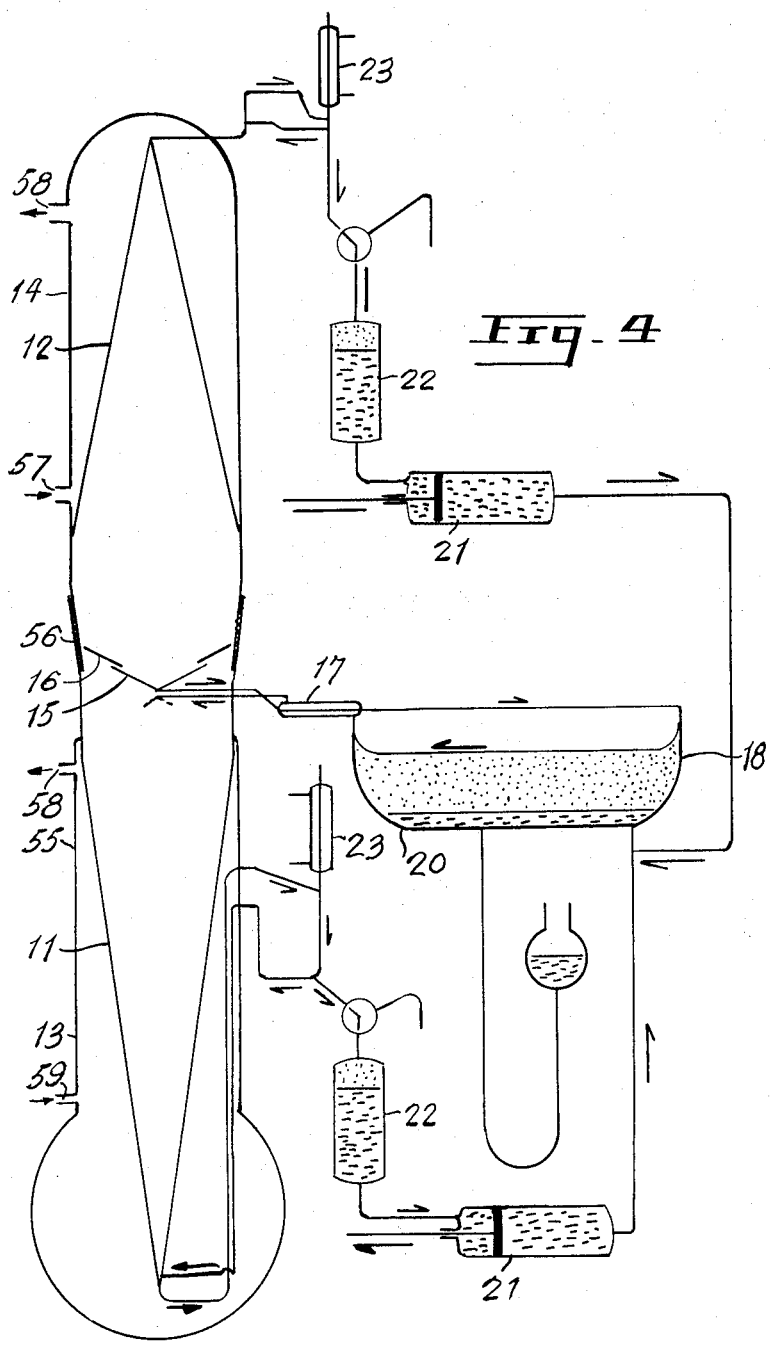

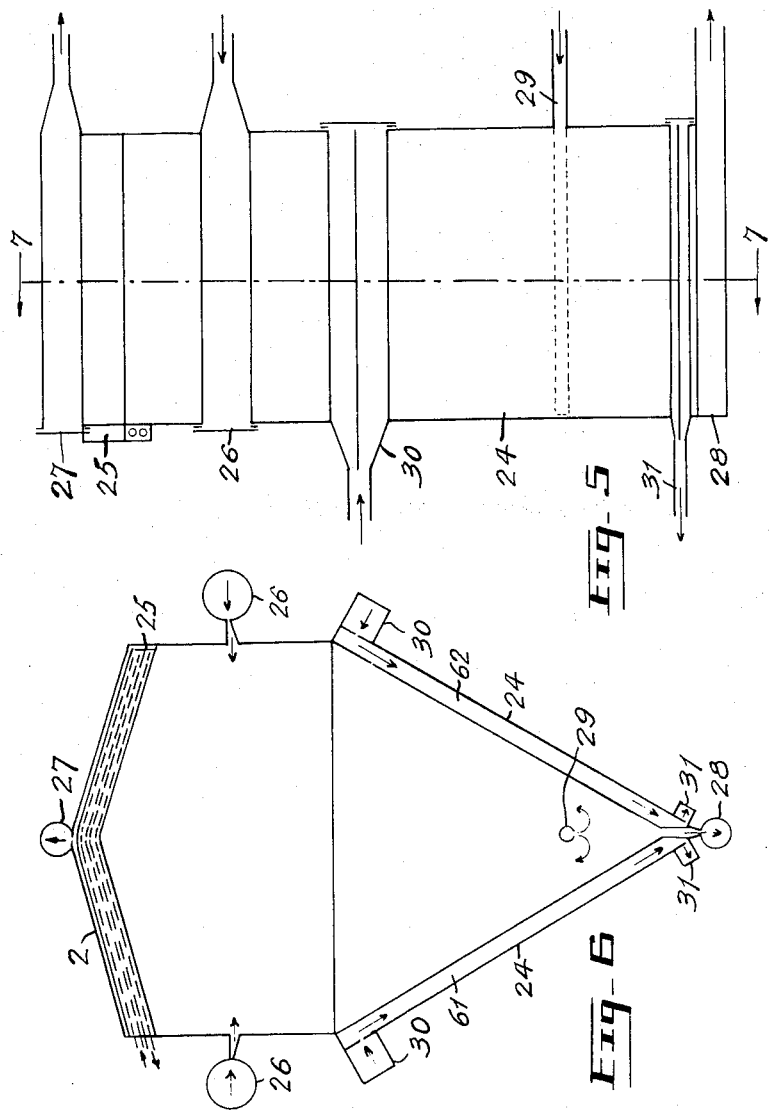

May 3, 1966 W. A. MUELLER 3,249,516
FRACTIONAL DISTILLATION COLUMN WITH INCLINED WALL SECTIONS
Filed May 15, 1962 9 Sheets-Sheet 6

Inventor
Walter Adolf MUELLER
Attorney

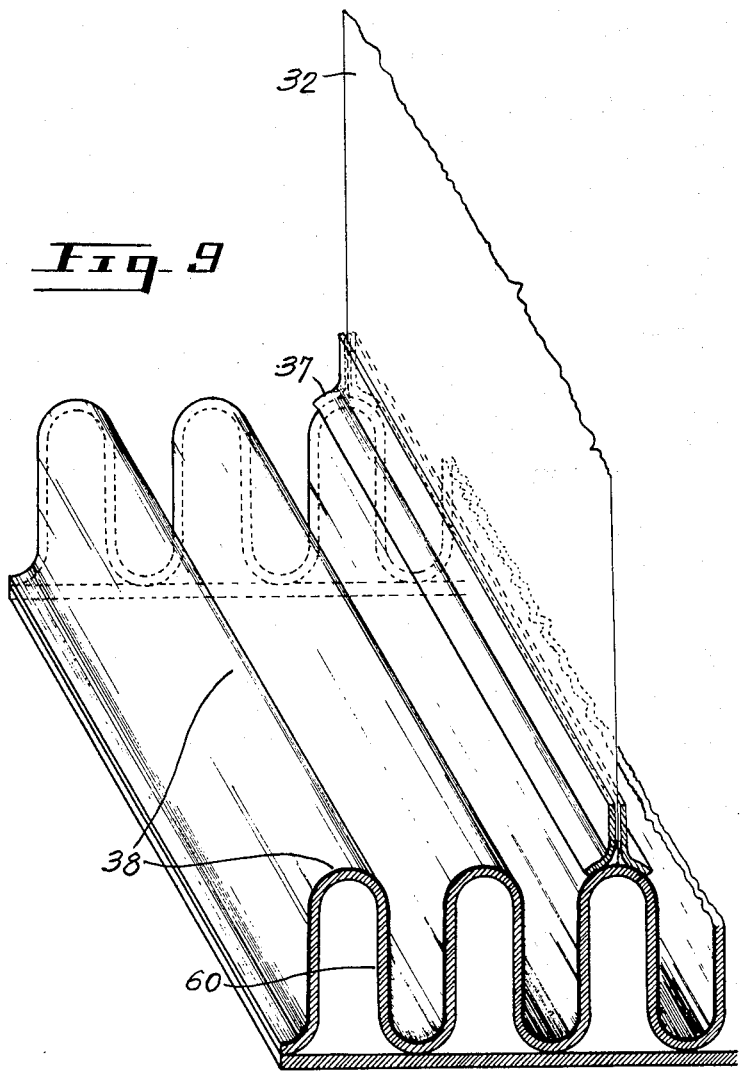

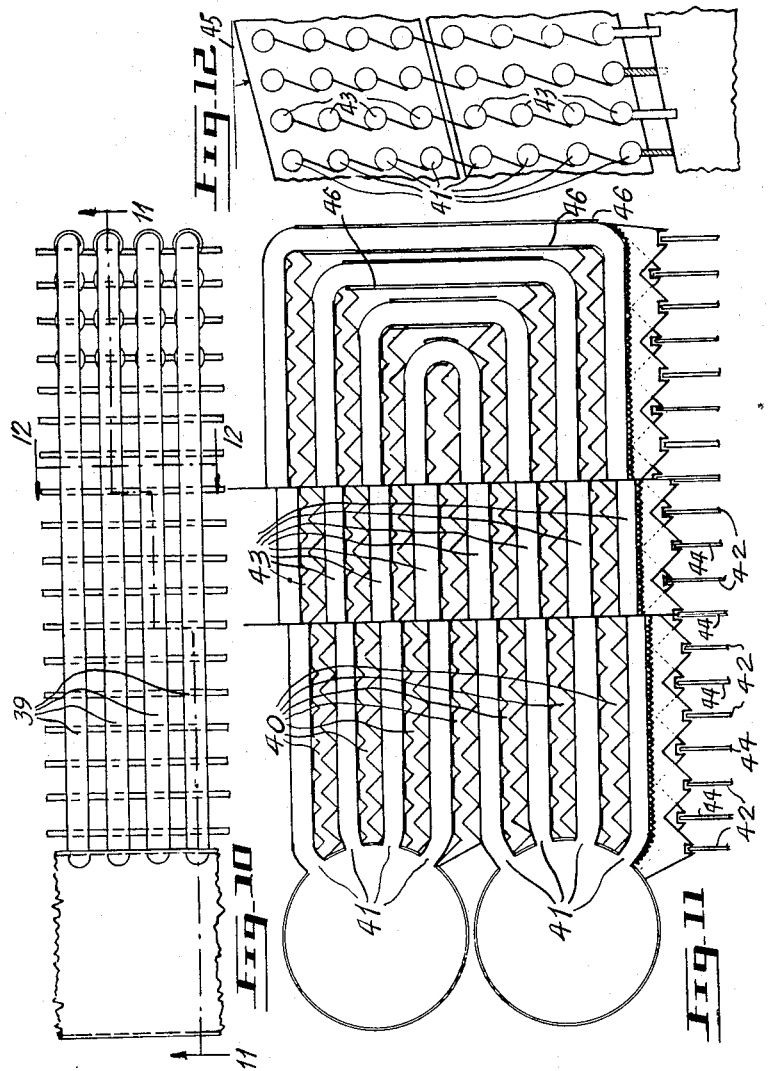

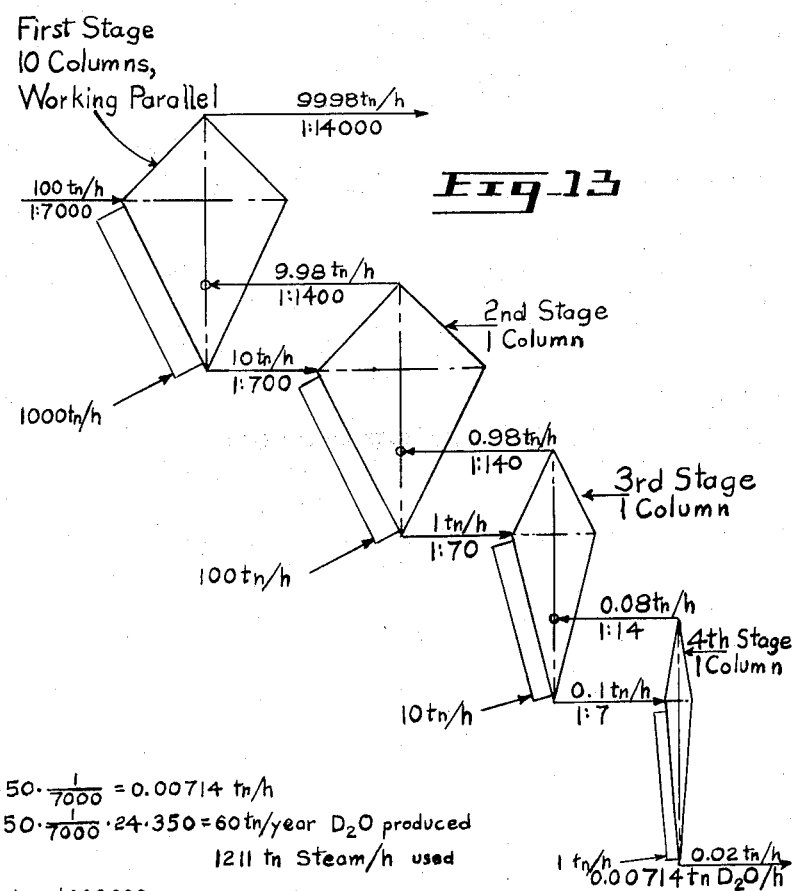

United States Patent Office 3,249,516
Patented May 3, 1966

3,249,516
FRACTIONAL DISTILLATION COLUMN WITH INCLINED WALL SECTIONS
Walter Adolf Mueller, Dorval, Quebec, Canada, assignor to Planex Associates Ltd., Montreal, Quebec, Canada
Filed May 15, 1962, Ser. No. 194,822
6 Claims. (Cl. 202—158)

This invention relates to improvements in fractional distillation. More particularly, this invention relates to improved fractional distillation columns.

In a fractional distillation column, a continuous exchange takes place between the downward flowing condensate and the upward flowing vapourized liquid. By this exchange, the condensate becomes increasingly enriched in the less volatile component as it flows downwards while, correspondingly, the vapourized liquid is increasingly enriched in the more volatile component as it flows upwards.

Various distillation columns have been designed to promote this enrichment of the less volatile fraction in the condensate and of the more volatile fraction in the vapourized liquid by improving vapour-liquid contact. One of these is the bubble-cap plate type column in which condensate accumulates at each horizontal plate. Another type is the perforated or sieve plate column, the plates of which are also in horizontal position. A third type of column is the conventional packed column in which the column is packed with rings, balls or other small bodies. A fourth type of column has recently been designed and has been applied specifically to the separation of heavy water in large scale operation. This type of column can be termed the liquid film type or wetted wall type in which the condensate accumulates and flows downwards as a thin film on the surface of packings such as, for example, vertical sheets.

The following characteristic features are common to the aforesaid fractional distillation columns. The total flow of vapour and condensate passes through the whole length of the column, except for fractions that might be removed at any intermediate level. The total flow of condensate accumulates in the heater or reboiler at the lower end of the column, except for the fraction of low volatility which may have been removed. Similarly, the total flow of vapour is condensed at the upper end of the column and is returned to the column as condensate, except for the fraction of high volatility which may have been removed. Any heating or cooling effect results in a change in the rate of total flow.

It is an object of the present invention to improve the efficiency in fractional distillation and, accordingly, to provide fractional distillation columns of improved efficiency. It has now been found that the efficiency of fractional distillation columns can be greatly improved by changing the cross-section of fractional distillation columns while controlling the vapor flow and the vapour velocity, in the part or reduced cross-section by heat-exchange means such as, for example, heating or cooling.

The invention thus consists in a fractional distillation column for separating components of a mixture of liquids of different volatility, comprising (1) an upper section, (2) a middle section, (3) a lower section having a progressively decreasing total horizontal cross-section with increased distance from said middle section, (4) an inlet located in said middle section, for feeding said mixture, (5) an outlet above said inlet for withdrawing a fraction of higher volatility, (6) a second outlet located in said lower section for withdrawing a fraction of lower volatility, (7) means for supplying heat by conduction to said lower section, so as to maintain the vapour flow proprotional to the horizontal cross-section of the column and the vapour velocity inversely proportional to the vapour pressure in said column.

Thus, both conditions can be satisfied my maintaining the vapour flow proportional to the ratio of the horizontal cross-section to the vapour pressure.

In the present specification and claims, the vapour flow is defined as the amount of vapour which flows through a given cross-section of a column per unit of time. The vapour velocity is defined as the distance covered by the vapour per unit of time.

The invention further consists in a fractional distillation column as hereinbefore described, in which the feed is contained in a separate closed container and in which the total downflow of condensate is removed at a point above the feed point and is conducted through the total length of said container in which it displaces liquid of lower purity, said liquid of lower purity being fed to the column as feed of the same volume as the total volume being removed at any point of the column.

The concept of the present invention is applicable to distillations in which it is desired to enrich a component of any initial concentration.

It can also be seen that, in the case when the vapour velocity is controlled so as to be inversely proportional to the square root of the vapour pressure, the only requirement is that the vapour flow be maintained proportional to the ratio of the horizontal cross-section to the square root of the vapour pressure.

In fractional distillations in which it is desired to enrich a component of vary low initial concentration $c_1$, the concept of the present invention is incorporated by progressively decreasing the cross-section of the upper or lower sections of the column in the respectively required direction substantially in an exponential manner with increased distance from the middle section, since the concentration increases in exponential manner with increased distance from the feed point. Thus, the horizontal cross section of the column is chosen so as to be inversely proportional at any point of the column to the concentration of the component which is to be separated. At the same time, to maintain the efficiency constant at different levels of the column, the vapour velocity is controlled so as to be inversely proportional to the vapour pressure and the vapour flow is controlled so as to be proportional to the horizontal cross-section of the column.

Thus, in fractional distillation columns embodying the present invention, provision is made for heat-exchange means, such as heaters or coolers located either inside or outside the column, for maintaining the required vapour velocity and vapour flow.

A preferred embodiment of this aspect of the invention consists in providing a column in which the cross-section of the relevant part of the column is progressively reduced by providing a series of stages of gradually decreasing size. Thus, if the concentration of the desired component of low initial concentration $c_1$ is increased $n$ times, i.e. from $c_1$ to $nc_1$, in the first stage of the column, the cross-section of the second stage required for reaching the same efficiency is only one $n$th of the cross-section of the first stage. This is explained by the fact that both the difference between the composition of the vapour and the composition of the condensate, and the highest possible transport of the desired component are proportional to the concentration of the desired component at low concentration values.

In fractional distillations in which it is desired to enrich a component of higher initial concentration, the highest possible transport is not exactly proportional to the concentration of the desired component, but can be easily determined from a McCabe and Thiele diagram of the liquid mixture to be processed. The most economical conditions can thus be determined from such a diagram. Reference is now made to FIGURE 1 of the drawings which shows such a diagram and in which:

$x$ is the liquid concentration which is expressed as the ratio of the molal concentration of the more volatile component to the total molal concentration.

$xi$ is the feed concentration.

$xd$ is the distillate concentration.

$xb$ is the residue concentration, and $X$ is the corresponding gas concentration.

In this diagram, operating line $o$ is defined as the line connecting the distillate concentration ($xd$) on the 45° line ($f$) with the point of the ordinate which corresponds to the value $Xd/(r+1)$, in which $r$ is the ratio of reflux to distillate.

In the absence of any change in the cross-section, heat content or temperature of a fractional distillation column, this operating line is a straight line. However, with a simultaneous reduction in the cross-section of the column, to 1/nth of the maximum value i.e. of that for the first stage of the column and application of heat-exchange means to change the vapour flow in a manner proportional to the reduction in the cross-section of the column, the ratio of total flow at a particular level to the rate of distillate removal, identified as $r+1$, is decreased to $(r+1)/n$. Hence, after each reduction of the cross-section of the column, a new operating line $o'$ is created which can be defined as the line connecting the distillate concentration ($xd$) on the 45° line ($f$) with the point at which it crosses the ordinate axis identified as $X/(r+1)$.

Thus, it can be seen that in order to attain the minimum column volume required for maintaining a certain rate of separation one would continuously shift the operating line on every plate half way between the 45° line ($f$) and the equilibrium line ($e$). Accordingly, the ratio $1/(Xf-Xo)$ $(Xo-Xe)$ is proportional to the volume of the column and according to the present invention, this ratio is to be kept substantially to its minimum value.

However, the reduction of the cross-section brings about a certain increase in the number of theoretical plates, which number is proportional to the ratio $(Xf-Xe)/(Xo-Xe)$.

Thus, in practice, the volume of the column is maintained at the lowest possible value without increasing the number of theoretical plates beyond economical limits.

Completely analogous rules can be applied with respect to the operating line ($o''$) concerning the removal of the residue, or lower boiling component. In this case, the ratio of the rate of total flow to residue or lower boiling component removal is $b$ and $(b+2-Xb)/(b+1)$ is the point of intersection of operating line $o''$ with the ordinate on the right side of FIGURE 1 of the drawings.

However, in a continuous distillation, impurities, present together with the desired component, are continuously added with the feed. Thus, these impurities being present in the feed in a concentration $c$, their concentration will be maintained in the liquid in the column at the minimum possible level of $c/(r+1)$ or above and will prevent obtaining the highest possible purity. An embodiment of the present invention consists in withdrawing the total condensate downflow at a point above the inlet for feeding the liquid to the column and to replace it by extra feed of lower purity from the closed container into which the removed condensate is conducted. Thus, this container also contains the liquid feed and provisions are made so that the removed condensate displaces a volume of liquid of lower purity in the container equal to the total volume of liquid being withdrawn from any point of the column. Thus, the liquid in the closed container is beng continuously purified to reach in time any desired degree of purity.

To obtain this purification most efficiently, two conditions should be observed:

(1) The circulation or displacement of liquid in the closed container should not leave any stagnant liquid.

(2) Through suitable means, mixing of two liquids of different purity should be avoided.

The invention will be further described with reference to the accompanying drawings, in which, apart from FIGURE 1, to which reference has been made hereinbefore:

FIGURE 2 represents an elevated cross-section of an embodiment of the invention, FIGURE 3 represents an elevated cross-section of still another embodiment of the invention, FIGURE 4 represents an elevated cross-section of still another embodiment of the invention, FIGURE 5 represents a side elevation view of still another embodiment of the invention, FIGURE 6 represents a cross-section along line 6—6 of FIGURE 5, FIGURE 7 is a perspective view showing details of the sheets used in the packing of a column according to the same embodiment, as shown in FIGURES 5 and 6, FIGURE 8 is a view in elevation showing details of an arrangement suitable to maintain the sheets equidistant from each other.

FIGURE 9 is an enlarged view showing in more detail parts 37 and 38 in relationship with sheet 32, as shown in FIGURE 8.

FIGURE 10 is a plan view, showing an arrangement of condenser tubes according to an embodiment of the invention.

FIGURE 11 is a cross-sectional view taken on line 11—11 of FIGURE 10.

FIGURE 12 is a cross-sectional view taken on line 12—12 of FIGURE 10.

FIGURE 13 is a vapour flow sheet of an embodiment of the invention.

In these figures, the same numerals apply to the same parts, when these parts are shown in more than one figure.

Figure 1:
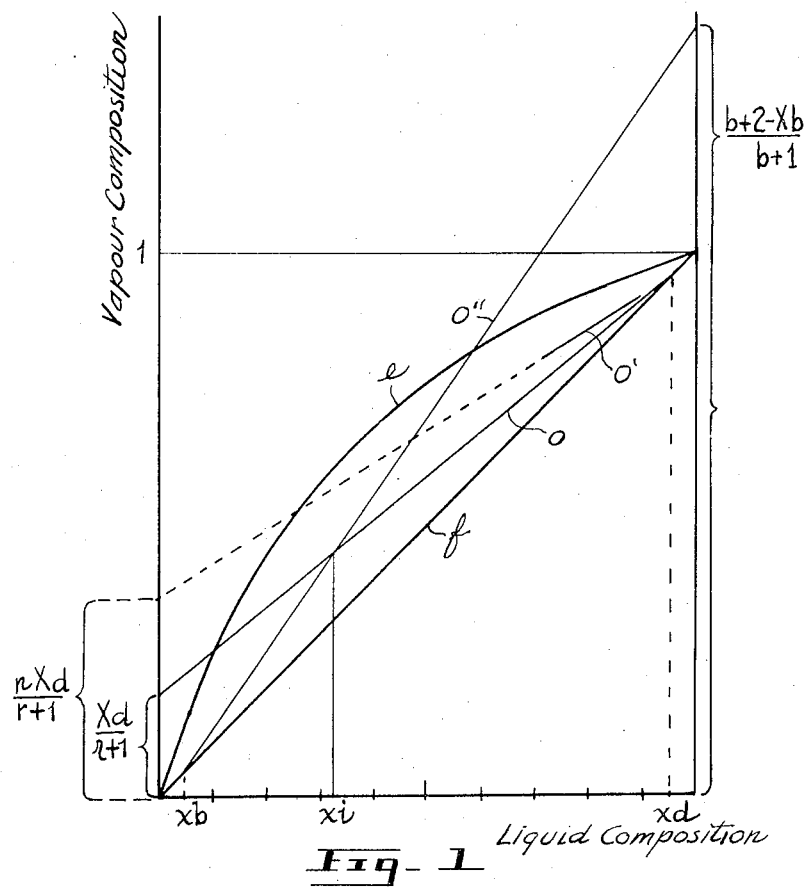

With particular reference to FIGURE 2 which represents an embodiment of the invention as applied to bubble-cap plate columns, FIGURE 2 more specifically represents the application when the less volatile fraction is to be enriched. Heating units 1 are provided for each plate 54 in the range of reduced cross-section. In this specific application, the cross-section of the lower section 3 of the column is gradually decreased with increased distance from the middle section. In this case, the middle section identifies itself with the inlet 51 for the feed. Each plate is provided with bubble-cap arrangements 52 so that the upwardly moving vapour can bubble through the condensate at each of these points and provision is made for downward movement of the refluxed liquid such as, passages 53, for example, as is well known in the art. The upper section 5 of the column may be of a conventional design with conventional condenser 6. A small reboiler 4 is provided at the lower extremity of the lower section.

Figure 3:
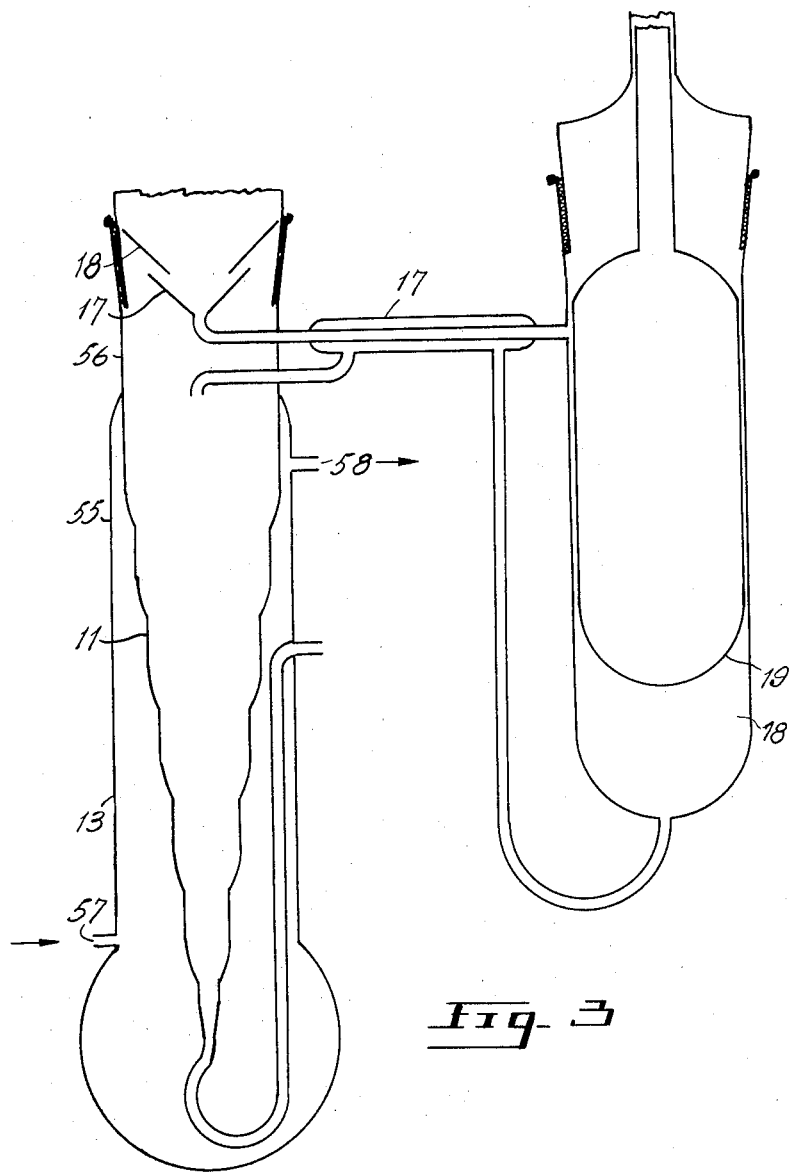

FIGURES 3 and 4 represent an embodiment of the invention especially adapted for use in research where very pure products are often desired from liquid mixtures. In this embodiment, fractional columns 55, which can be made from glass, have an increasing (11) or decreasing (12) cross-section with increased distance from the middle section 56. The whole changing cross-sections are surrounded by heaters 13 or coolers 14, as the case may be, provided by suitable inlets 57 and outlets 58. The total flow of condensate is removed from the middle section of the columns by such means as, for example, funnel 15 and baffle 16 and is conducted through heat exchanger 17 in which it comes in counter-current contact with the feed. From the heat-exchanger 17, the withdrawn condensate is conducted into and passes through the total extension of closed container 18. As distillate and residue are continuously removed from the column, the feed to the column should be of the same volume as the volume of liquid being withdrawn from the column which is the total of distillate, residue, and condensate being removed. To this end, the rate of overflow is increased by reducing the volume of container 18, for example, by immersing a solid body 19 or by adding mercury 20 to the container.

In the arrangement indicated in FIGURE 4, the mercury volume added equals the sum of the volumes of removed distillate plus residue. Thus the amount of process liquid in the column is kept constant. A piston 21 moved at a regulated speed controls the flow of mercury and the flow of distillate and residue to containers 22. To supply the required amount of distillate and residue to containers 22 sufficient condensate has to be produced in condensers 23, the surplus of which is conducted back to the column. Virtually any size of liquid to be purified can be handled by an arrangement similar to the one described in a still of appropriate dimensions provided that the attached container is sufficiently large.

With the arrangement just described, it is possible to carry out the purification of a liquid in a very fast manner and to obtain a liquid product of any degree of purity, and, if desired, of very high purity.

FIGURES 5 to 13 are particularly concerned with the application of the invention to fractional distillation columns of the liquid film type, and more especially to the application of the invention to the distillation of heavy water in such columns.

Canadian Patent No. 575,971 describes the distillation of heavy water in a liquid film distillation column, the disclosure thereof is hereby incorporated by reference. However, an improved arrangement has been found to improve the uniformity of distribution of liquid on the sheets used as column packing. The present arrangement provides considerable savings due to the fact that the thickness of the sheets used as packing can be considerably reduced. With the present arrangement, it is possible to operate with a lower pressure drop and at lower temperatures, thus taking advantage of the higher difference at lower temperatures between the vapour pressure of heavy water and the vapour pressure of ordinary water.

According to this embodiment of the invention, water is fractionated in a series of distillation columns, which represent different stages. 10 columns having volume $V$ constitute stage 1. One column having the same volume $V$ constitutes stage 2. One column having volume $V/10$ constitutes stage 3 and one more column having volume $V/100$ constitutes stage 4.

Figures 7, 8:
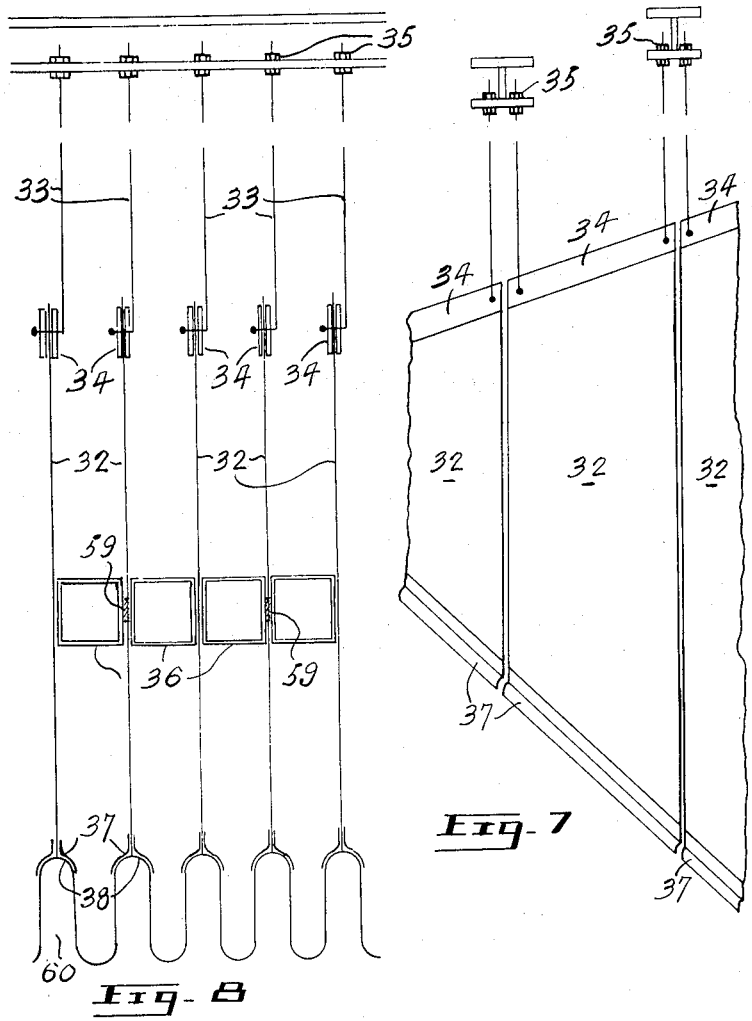

With specific reference to FIGURES 5 and 6 which illustrate one stage only, the other stages being identical except for their volume as indicated, providing by conduction the heat for evaporating the condensate at the inner surface of sheet 60 (FIG. 9) two steam chambers 61 and 62 each attached to two opposite sides of the lower section 24 of the column of reduced cross-section and a condenser 25 is also directly attached to the column at the upper side 22. The vapour to be processed is fed in through inlets 26 and the fraction depleted of heavy water is recovered through outlet 27 while the fraction enriched in heavy water is recovered through outlet 28. The back flow of vapour from the second stage is fed into the column at inlet 29. Steam is circulated through the reboiler through inlets 30 and outlets 31. As shown in FIGURES 7 and 8, the volume of the still is completely filled with sheets of aluminum foil 32, suspended from above by means of lifting strips or wires 33, which are fed through the strengthened upper edge 34 of the sheets and suspended from a point 35 above the cooler. The arrangement for effecting uniform distribution of condensate on the column sheets will be described in connection with FIGURE 11. Very thin aluminum foil can be advantageously chosen for the column packing. The sheets are kept at equal distance by aluminum slugs or short pieces of aluminum tubing 36 soldered or screwed in couples to the same number of points 59 at identical locations of every second sheet. The lower edge of these sheets is sandwiched between two aluminum stripes 37 that are placed on the top crests 38 of corrugated sheets 60 of the reboiler. For practical considerations, the cross-section of the column is not reduced in an exactly exponential manner, but linearly and, thus, only approximates the ideal conditions.

The point of connection between aluminum sheets, stripes 37 and crest 38 of the corrugated sheets 60 is shown in more detail in FIGURE 9.

Of high importance is the complete vapourization of the condensate film on the corrugated surface of the steam chambers close to the point at which it arrives flowing down the column sheets. This effect can be promoted by extending a thin net of aluminum wire (not shown in the drawing) over the surface of the steam chambers.

An important feature of the still is the decrease of the cross-section of the still in its lower section. This decrease of the cross-section does not reduce the transport of the less volatile heavier fraction of heavy water, because the increased concentration allows to maintain given transport at a reduced cross-section. It is advantageous with respect to the removal of the depleted vapour to decrease the width of the column above the inlet for the vapour feed so that the depleted vapour can be removed from the top crest only, through outlet 27, instead of from the total upper range. The slope of the top range is dictated by the intention of uniform removal of the depleted fraction from the total upper range.

Of special importance is the uniform distribution of the condensate over the whole surface of the packing sheets. This is done, as shown in FIGURES 10, 11, and 12, by leading the condensate formed on condenser tubes 39, vertically downwards by means of profiled aluminum strips 40. The condensate of a set 41 of 4 tubes goes to every second column plate 42 and alternatingly from the next set 43 of 4 tubes to the remaining column plates 44. To direct the vapour flow of the non-condensed fraction to the top crest, the condenser is inclined at an angle shown at 45 with the horizontal plane. This angle is increased with increasing amount of vapour flow directed to the top crest. The vertical fraction 46 of the condenser tubes is insulated so as to produce the same amount of condensate per square area as supplied to the column sheets generally below the horizontal fraction of the tubes. In order to distribute the feed of vapour at the inlet uniformly over the whole number of distillation spaces between the vertical sheets of the column, the vapour feed passes from inlet 26 through a narrow passage of uniform width to the column, as shown in FIGURE 6.

To maintain a uniform flow, it is preferred to submit the aluminum sheets to a chemical treatment with caustic soda solution. This treatment has a strong effect in promoting the formation of the uniform thickness of the condensate film.

FIGURE 13 represents a vapour flow sheet of a four stage distillation arrangement for the recovery of heavy water. The flow figures refer to the use of 1111 $tn/h$ heating steam and 100 $tn/h$ process steam with a production of 66.7 $tn$ $D_2O$ per year under ideal conditions. The ratio figures, e.g. 1:14,000, 1:7000 represent the ratio of the concentration of D to the concentration of H in the water.

In the example illustrated, the concentration of heavy water in the fraction removed at the bottom amounts to ten times the concentration of the feed. As is well known in the art and as mentioned hereinbefore, the ten times increased concentration allows the operation in a stage of one-tenth of the cross-section of the previous stage. Hence the ten columns of the first stage operating in parallel, while 1 column of the same size represents the second stage, the columns of the following stages being only one tenth the size of the preceding stage. In this respect, it may be advantageous to attach two succeeding stages, one to the other.

The advantages of the present invention are numerous and can be seen from the preceding description. Some of these advantages, which apply to the invention as carried out in any type of column are:

(a) The volume in the part of the column which is decreased in cross-section and the volume of packing used in that part are reduced to about one half or one-third of the volume of a conventional column without losing efficiency at equal through-put.

(b) The time required to reach steady state from start-up is only a very minor fraction of that required for a conventional column, because, due to the changing cross-section and due to the small quantity of the condensate present at or in the heater, only a minor fraction of the condensate has to reach the desired concentration before steady state is reached.

Other advantages of the present invention when applied to liquid film type columns are:

(a) The very uniform flow of steam and condensate permits one to obtain in commercial units the high efficiency known of small units only.

(b) In a single stage the enrichment of the fraction can be higher than in conventional columns without making the column inefficient.

(c) When the liquid film column is packed with aluminum sheets, because of the suspension arrangement and the absence of turbulence, it is possible to use very thin aluminum foil in place of thicker aluminum plates of the prior art.

(d) The column construction makes possible a very low pressure drop between heater and cooler, without sacrificing the efficiency. This makes distillation possible at very low pressure and temperature. In the distillation of heavy water, this feature becomes very important because of the markedly increased difference with lower temperatures between the vapour pressure of heavy water and that of ordinary water. Moreover, in view of the lower temperatures at which the distillation of heavy water can be carried out, inexpensive waste steam from power stations can be used in the process.

The invention has been described in general terms, and more especially, as applied to heavy water distillation. However, it is apparent to one skilled in the art, that the invention is applicable to many similar applications, such as, for example, distillation and/or concentration of ethyl alcohol, in the petrochemical industry, in the pharmaceutical industry, and for azeotropic separations.

I claim:

1. A vertically disposed fractional distillation column for separating and recovering components of a mixture of miscible liquids of different volatility comprising:

walls defining an upper section;

walls defining a middle section;

walls defining a lower section, at least a portion of the walls defining said upper and lower sections being inclined from the walls of said middle section toward the axis of said column so as to form upper and lower sections having a progressively decreasing total horizontal cross section with increased distance from said middle section;

inlet means located in said middle section for feeding said liquid mixture into said column during operation;

outlet means located above said inlet means for withdrawing a high volatility fraction of said mixture during operation;

second outlet means located in said lower section for withdrawing a low volatility fraction of said mixture during operation; and means for producing an upward flow of vapor in said column and for maintaining the vapor flow proportional to the ratio of the horizontal cross section to the square root of the vapor pressure, said means including heat exchange means comprising a jacket covering the inclined wall portion of the lower section for supplying heat by conduction to said lower section without introducing additional fluid into said column, and including heat exchange means comprising a jacket covering the inclined wall portion of the upper section for supplying cold by conduction to said upper section without introducing additional fluid into said column.

2. A fractional distillation column, as claimed in claim 1, wherein said cross-section of said lower and upper sections decreases substantially in an exponential manner with increased distance from said middle section.

3. A fractional distillation column, as claimed in claim 1, wherein said sections having progressively decreasing total horizontal cross-sections are conical.

4. A fractional distillation column, as claimed in claim 1, further comprising a separate closed container for said mixture to be separated, means for conducting the high volatility fraction from said first-named outlet means through the total length of said container to displace therein liquid of lower purity, and means for supplying to said inlet from said liquid of lower purity a volume of liquid substantially equal to the total volume being removed at any point of the column.

5. A fractional distillation column, as claimed in claim 4, further including a heat exchanger for passing the total liquid flow from said first-named outlet means in heat exchange relationship with the liquid supplied to said inlet means.

6. A fractional distillation column, as claimed in claim 1, in which the upper, lower, and middle sections of the column are packed with equidistant, parallel, vertical sheets of material inert to the mixture being distilled, said sheets being suspended from the top of the column, in the entire cross-section of said column.

References Cited by the Examiner

UNITED STATES PATENTS

| 1,403,723 | 1/1922 | Von Recklinghausen 202—158 X |
| 1,567,458 | 12/1925 | Newton 196—120 X |
| 1,942,767 | 1/1934 | Oman et al. 202—158 X |
| 2,578,670 | 12/1951 | Carleton. |
| 2,581,881 | 1/1952 | Pyle et al. 202—158 X |
| 2,615,835 | 10/1952 | Dixon 202—153 |
| 2,713,023 | 7/1955 | Irvine 202—158 X |
| 2,725,343 | 11/1955 | Lambert 202—158 X |
| 2,845,444 | 7/1958 | Thomson 202—158 X |

FOREIGN PATENTS

| 575,971 | 5/1959 | Canada. |
| 806,975 | 1/1959 | Great Britain. |

NORMAN YUDKOFF, *Primary Examiner.*

GEORGE D. MITCHELL, *Examiner.*

F. E. DRUMMOND, W. L. BASCOMB,
*Assistant Examiners.*